April 8, 1969 I. J. H. CLARKE-POUNDER 3,437,204
SCREENING APPARATUS
Filed Dec. 27, 1965 Sheet 1 of 3

INVENTOR.
IAN J. H. CLARKE-POUNDER
BY
David W. Tillott
ATTORNEY

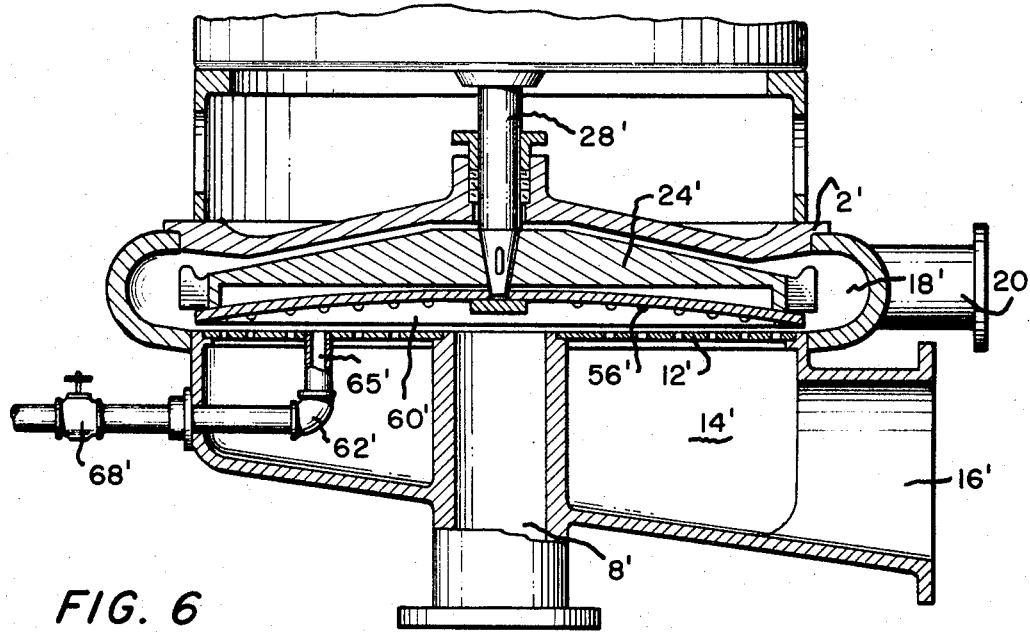
FIG. 6
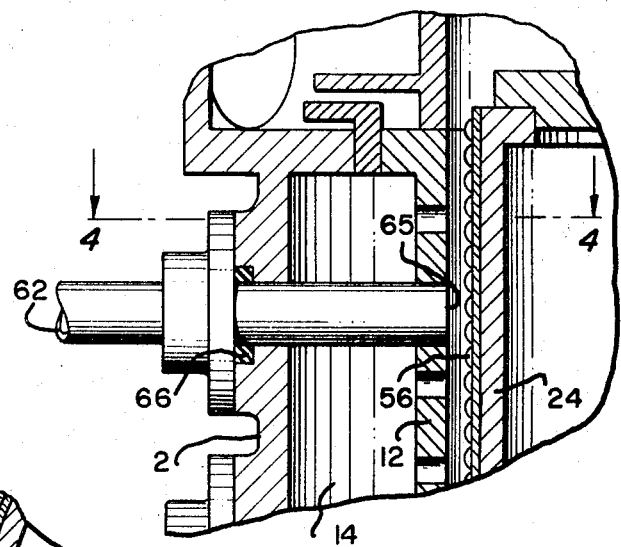
FIG. 4
FIG. 3
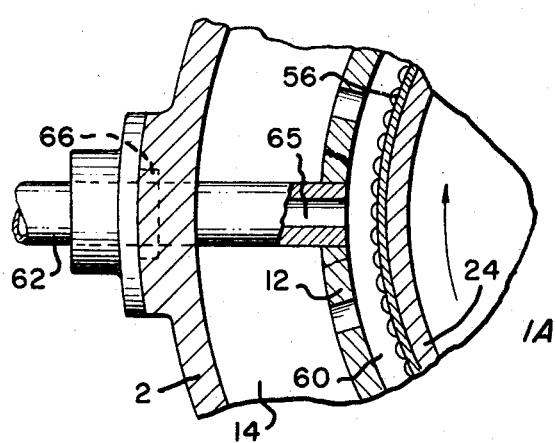
INVENTOR
IAN J. H. CLARKE-POUNDER
ATTORNEY

INVENTOR.
IAN J. H. CLARKE-POUNDER

United States Patent Office 3,437,204
Patented Apr. 8, 1969

3,437,204
SCREENING APPARATUS
Ian J. H. Clarke-Pounder, Pierrefond, Quebec, Canada, assignor, by mesne assignments, to Bird Machine Company, a corporation of Massachusetts
Filed Dec. 27, 1965, Ser. No. 516,537
Int. Cl. B07b 1/20
U.S. Cl. 209—273       7 Claims

ABSTRACT OF THE DISCLOSURE

Pressure screening apparatus for paper manufacturing pulp and the like including a rotary drum mounted on a vertical axis and having a circumferential surface carrying pulse generating means, a cylindrical screen surrounding the drum in spaced relationship to provide an annular screening zone therebetween, an inlet for feeding stock to the top end of the screening zone, an accepts outlet on the outside of the screen for discharging acceptable matter and a rejects outlet for discharging rejected matter from the lower end of the screening zone. A conduit extends radially inward through the screen and has a discharge outlet on the inner face of the screen intermediate the top and bottom ends of the screening zone for discharging dilution liquid to the screening zone over a minor portion of the circumference of the screening zone.

---

This invention relates to the art of screening liquid and fiber mixtures, sometimes called suspension slurries, and, more particularly, to the art of screening paper making pulps. Specifically, this invention is an improvement on the screening apparatus disclosed in my United States patent application, Ser. No. 363,438, filed Apr. 29, 1964, now U.S. Patent No. 3,363,759.

The above patent application discloses a screening apparatus which can operate under pressurized conditions, i.e., being connected in a system operating at pressures substantially above atmosphere. The many benefits of pressurized operation, above atmospheric pressure, are well recognized in the paper making art.

In the paper making process, pulp is produced by cooking or grinding wood, both procedures being performed to separate the wood into individual fibers. Due to the different characteristics of the wood from the same tree, some of the fibers do not separate and are discharged from the cooker or grinder as fiber bundles called debris, slivers or shives. Following a coarse screening operation to remove very large particles, e.g. 1¼ x 1¼ x ³⁄₁₆ chips, the pulp (fiber and water) is screened by primary fine screens. These primary screens attempt to separate the debris from the pulp; e.g. the portion separated from the debris being called accepts and the debris portion being called rejects. The rejected portion contains, in practice, a large proportion of good fiber and additional screening steps can be used to further separate the debris or shives from good fiber, these steps being called secondary, tertiary, etc., steps.

The screening apparatus disclosed in my above noted patent application is useful in performing either a primary fine screening step or a subsequent screening step such as a secondary screening step. The major difference between a primary screening step and a secondary screening step is that the percentage of debris or shives in the material fed to a primary screening step is much lower than in that fed to a secondary screening step. For example, in a paper making process using ground wood pulp, the debris content in the inlet flow to the primary screening step may be .86% while the debris content in the inlet flow to the secondary screening step may be 8.9%. In addition, the inlet pulp in a secondary screening step has a higher freeness, that is to say, the fibers allow liquid to drain through a mass of fibers much more easily.

In the operation of a screening apparatus of this type, the percentage weight ratio (solid material only) of rejected material rate over inlet material rate is termed "Percent Rejects by Weight" and is written mathematically as:

$$\frac{\text{Rejects tons per day}}{\text{Inlet tons per day}} \times 100$$

In order to operate the screening apparatus, disclosed in my above mentioned application, properly in a secondary or subsequent screening step, it has been found that the Percent Rejects by Weight cannot be reduced below a minimum satisfactory value, say 50%. If the Percent Rejects by Weight is reduced below this minimum ratio, the screen plugs.

The principal object of this invention, in either a screening operation handling material having a high debris content or in a subsequent screening step, is to reduce the minimum Percent Rejects by Weight substantially below the minimum required for the proper operation of the screening apparatus disclosed in my earlier mentioned U.S. patent application.

Briefly, the foregoing object is accomplished by introducing dilution liquid into the screened material as it flows through the screening zone and across the screen.

In general, it is known in the prior art to introduce dilution liquid to a liquid mixture during a screening process. Where a rotary member is used in conjunction with a screen, it is conventional to introduce a dilution liquid through the rotary member. This method of introducing the dilution liquid necessarily imparts a high centrifugal velocity to the dilution liquid which has been found to drastically interfere with the proper mixing of the dilution liquid and the mixture being screened.

Attempts have also been made to feed dilution liquid into an annular outlet located in a rotary member. This arrangement has been found to be unsatisfactory in the screening apparatus disclosed in my aforementioned U.S. patent application because the dilution liquid exiting from the annular outlet into the screening zone creates a form of liquid barrier which interferes with the proper flow of the mixture being screened through the screening zone and also interferes with the proper mixing of the dilution liquid and the mixture being screened.

Further attempts have been made to feed dilution liquid into an annular outlet located in the screen surrounding a rotary member. This arrangement has been unsatisfactory due to the fact that uniform dilution injection around the entire circumferential length of the screening zone tends to form a hydraulic barrier to the flow of the inlet pulp through the screening zone thereby hindering the rejection of concentrated debris and alternately causing reduced accepts flow and eventual plugging of the screen apertures. A further disadvantage to this method arises from the fact that it is common to use "white water" for dilution; white water contains some fine fibers and where the annular ring contains openings for the flow of dilution liquid to enter the screening zone, these fibers eventually plug the openings and the annulus.

A further important object of this invention is to provide an arrangement for satisfactorily introducing dilution liquid into the screening zone of the screening apparatus disclosed in my aforementioned patent application without either interfering unduly with the flow of liquid mixture through the screening zone or with the proper mixing of the dilution liquid and the mixture being screened.

Other important objects of this invention include: to provide an improved screening apparatus for pulp mixtures containing a high debris content, having the ability of producing an increased ratio of acceptable screened material relative to the material fed to the apparatus; and to provide an improved method of adding dilution liquid to a screening mixture.

In brief, the above objects are attained by introducing the dilution mixture through an outlet of substantial size extending through the screen and terminating at the surface of the screen. Preferably, the axis of the outlet extends substantially radially to the rotary member. This arrangement has been found to provide a relatively uniform mixing of the dilution liquid with the mixture in the screening zone without interfering with the flow of material through the screening zone.

This invention is described in connection with the drawings wherein:

FIG. 3 is an enlarged fragmentary portion of FIG. 1;

FIG. 4 is a section with portions cut away and taken on the line 4—4 of FIG. 3;

FIG. 6 is an elevational view with portions being cut away and shown in section of a second embodiment of screening apparatus incorporating the invention.

Figure 1:
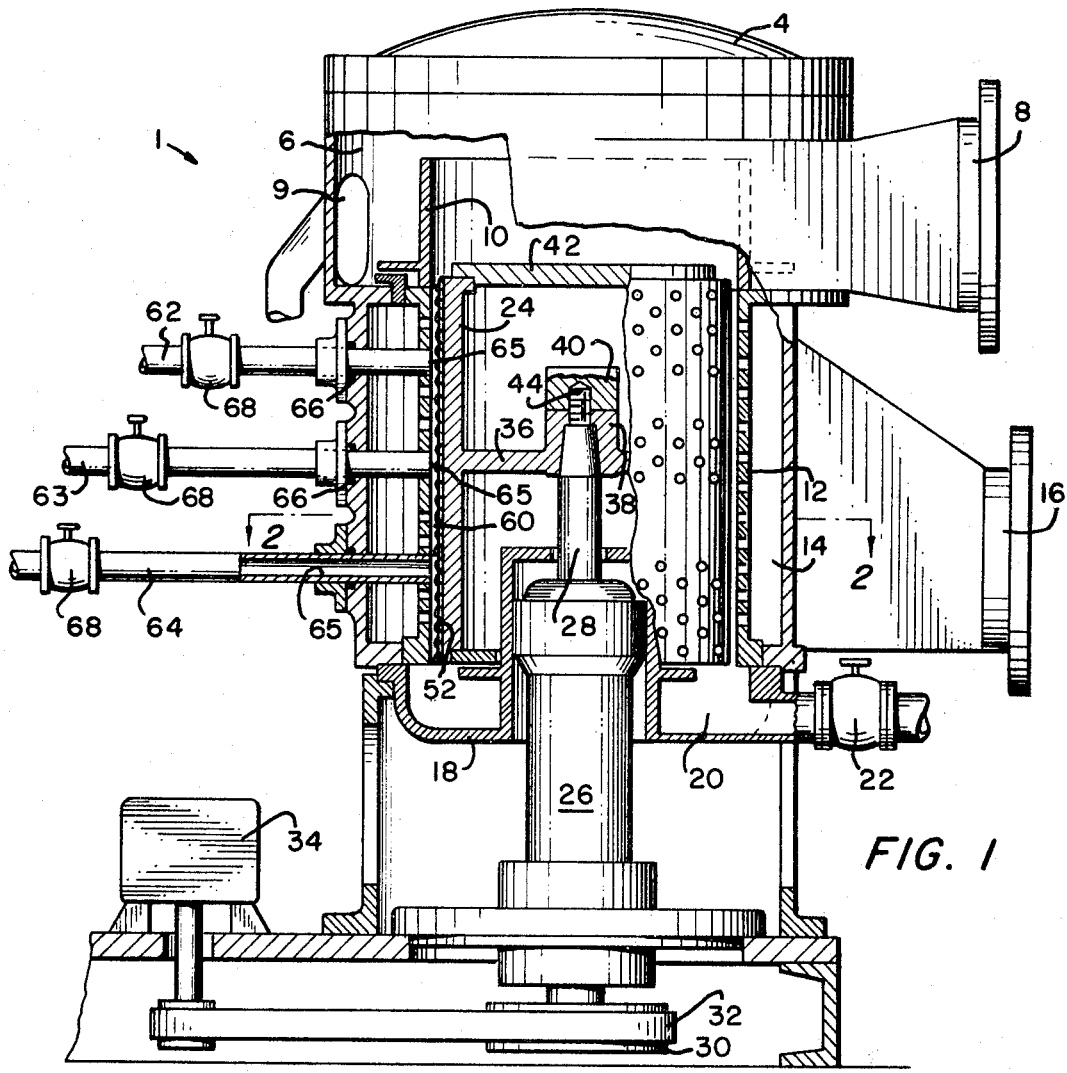
FIG. 1 is an elevational view with portions cut away and shown in section of an embodiment of screening apparatus incorporating my invention.
Figure 2:
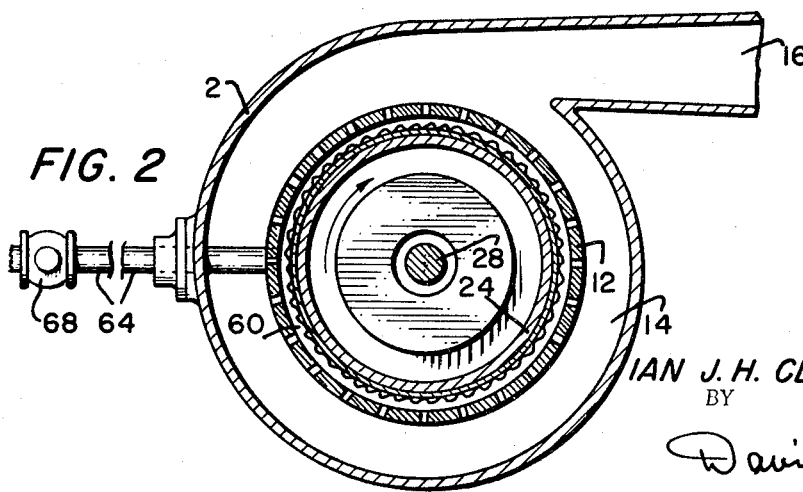
FIG. 2 is a section taken on the line 2—2 of FIG. 1.

The screening apparatus 1 shown in FIGS. 1 and 2 includes a vertically arranged pressure casing 2 including a removable pressure dome 4. An annular inlet gutter 6 is defined in the upper region of the casing 2 and an inlet conduit 8 is arranged to introduce pulp to be screened into the inlet gutter 6. A gutter trap 9 communicates with the inlet gutter 6 for removing heavy debris or chips thrown to the periphery by centrifugal force.

The inlet gutter 6 communicates radially over a baffle 10 with the central part of the screening apparatus. Below the baffle 10 is located a circumferential, stationary, apertured screen member 12 whose walls are spaced inwardly relative to the casing 2, so as to define an annular accepts chamber 14 outside of the screen member 12. A tangential accepts conduit 16 adapted to remove fluid under substantial pressure is connected to the accepts chamber 14, having its initial portion extending the full height of the screen member 12. The stationary screen member 12 may be of the usual form for fine screening, e.g. it can have 23% open area provided by circular holes of 1/16 inch diameter spaced in a staggered pattern on 1/8 inch centers.

Below the screen member 12 is arranged an annular rejects gutter 18 in communication with the inside of the cylindrical screen member 12. A rejects conduit 20 communicates with this rejects gutter 18, this conduit being capable of removing fluid under substantial pressure and being provided with a valve 22 which serves to regulate the flow therethrough.

FIG. 2 illustrates that the pressure casing 2 is slightly scroll-shaped in horizontal cross section, and the screen member 12 is arranged therein so that the accepts chamber 14 increases in radial width gradually about its circumference, all the way along its extent until it discharges to the accepts conduit 16.

The screening apparatus 1 further includes a rotary drum 24 of circular cross section mounted inside of and substantially concentric with the cylindrical screen member 12. In an example embodiment of this apparatus, the rotary drum has a diameter of about 18". As shown, preferably the rotary drum 24 is of cylindrical shape, has a length substantially equal to that of the screen member 12, is continuous circumferentially and has a diameter slightly smaller than the screen member, to provide a clearance therebetween, and is continuous circumferentially. Regarding the details of mounting in this preferred embodiment, the rotary drum 24 is mounted upon a rotary shaft 28 which extends through a stationary bearing pedestal 26. For this purpose two vertically spaced-apart sets of ball bearings (not shown) are employed in the pedestal, one or both of which can take the axial thrust applied to the rotary drum 24.

The lower end of the rotary shaft 28 extends below the bearing pedestal 26 and carries a pulley 30. This pulley is driven by a belt 32, or a series of belts, from an electric motor 34 capable of turning the drum 24 to develop a surface speed of about 6,000 f.p.m. when the screening apparatus 1 is full of fluid.

Referring still to FIG. 1, preferably the drum member 24 has a central web 36, located substantially mid-way between its ends, at least near its center of gravity, joined to a hub 38 which is removably mounted upon rotary shaft 28 by means of a mounting nut 40 threaded on the threaded end 44 of the rotary shaft 28.

The rotary drum 24 in this embodiment is of cylindrical form and is defined by a continuous outer base surface 52 provided with a series of separate projections or bumps 56 which are generally rounded. The specific shape and spacing or arrangement of the bumps 56 are described in my U.S. application, Ser. No. 363,438, which was mentioned previously. In addition, this earlier application discusses the specific function and operation of the bumps 56 in conjunction with the operation of the screening apparatus 1.

The space defined between the rotary drum 24 and the screen member 12 is referred to as the screening zone 60. The screening zone 60, as shown, has a uniform radial depth due to the fact that both the screen member 12 and the rotary member 24 are cylindrical.

It will be appreciated that with movement of the rotary drum 24 in the direction of the arrow shown in FIGS. 2 and 4, each bump 56 produces a localized reduction of volume to the screening zone 60 as it travels with the rotary drum 24. The multiplicity of bumps 56 present on the rotary drum 24 cause a large number of these disturbances to occur and, as a result, the fluid in the screening zone is homogenized and fluidized to aid in the screening operation. All of the foregoing structure is disclosed by my earlier-mentioned U.S. patent application.

This invention involves the introduction of dilution liquid into the mixture being screened as the mixture passes through the screening zone 60. FIG. 1 shows three dilution pipes 62, 63 and 64 having respective outlets 65 fixed in the screen 12 at different levels and terminating at the inner surface of the screen 12. Preferably, the outlets 65 are located flush with the inner surface of the screen 12. In extending outwardly, each of the pipes 62, 63 and 64 extends through both the accepts chamber 14 and the outer wall of the casing 2 with a sealing means or gasket 66 provided between the casing outer wall and the pipe to prevent leakage from the accepts chamber 14. Each of the pipes 62, 63 and 64 further includes a valve 68 for controlling the flow of liquid in the pipe.

Each of the dilution pipes, 62, 63 and 64, and its outlet 65 is of substantial size, say 1¼", so that it is not likely to be clogged by the passage through it of a dilution liquid containing a small amount of pulp fibers. This feature is important because it is more economical in the paper making industry to use "white water" for dilution purposes rather than perfectly clean water. "White water" is liquid separated from paper pulp by a screening or thickening process and which contains a slight amount of fiber due to the inability of the thickening apparatus to completely separate liquid and fiber into two individual components.

It is economically preferable to have the pipe outlets 65 extending substantially radially to the screen 12. One reason for this is to allow the rotary member 24 to be rotated in either direction without affecting the operation of the dilution pipes 62, 63 and 64.

In the operation of the screening apparatus 1, in a secondary screening operation, a mixture of pulp or fiber and water is constantly flowing downwardly through the screening zone 60 while the rotary drum rotates at a speed providing a peripheral speed of about 100 ft./sec. The debris or shive content of the mixture is rather high, say 8.9%. Portions of the water and acceptable fiber pass through the screen 12 into the accepts chamber 14 while the remainder of the mixture enters the rejects gutter 18. The screening apparatus may be adjusted to vary the portion of the pulp mixture reaching the rejects gutter 18. As the apparatus is adjusted to reduce the mixture portion entering the rejects gutter 18, the amount of debris, shives or undesirable matter attempting to pass through the screen 12 into the accepts chamber 14 becomes greater and the screen tends to plug. Ultimately, the screen plugs completely as the material entering the rejects gutter 18 is further reduced. In a secondary screening operation, experience has shown that, in order for the screening apparatus to operate satisfactorily without diluting the mixture during screening, the apparatus should be adjusted so that at least 55%, by weight, of the total solid material (fiber and debris) entering the apparatus flows out the rejects conduit 20.

In my improved method of screening, dilution liquid is fed through one or more of the dilution pipes 62, 63 and 64 and into the screening zone 60 as the pulp mixture flows through the screening zone 60 toward the rejects gutter. By terminating the dilution pipe outlets 65 flush with the inner surface of the screen 12, the dilution liquid enters the screening zone 60 without forming a hydraulic valve or barrier interfering with the flow of the pulp mixture through the screening zone 60. This asset of not forming a hydraulic valve or barrier is also probably due to the fact that the entry of the dilution liquid into the screening zone 60 is limited to a small portion or angular part of the circumference of the screening zone 60. Finally, due to the location of the pipe outlet 65 in the stationary screen 12, the dilution liquid is directed radially inward away from the screen 12 as it enters the screening zone 60, thereby promoting more uniform mixing of diution liquid with the pulp, which would not be the case if the dilution liquid were introduced through the rotary drum 24. It has been found that my method of introducing the dilution liquid contributes to a uniform mixing of the dilution liquid and the pulp mixture without substantially interferring with the flow of the pulp mixture through the screening zone 60.

Figure 5:
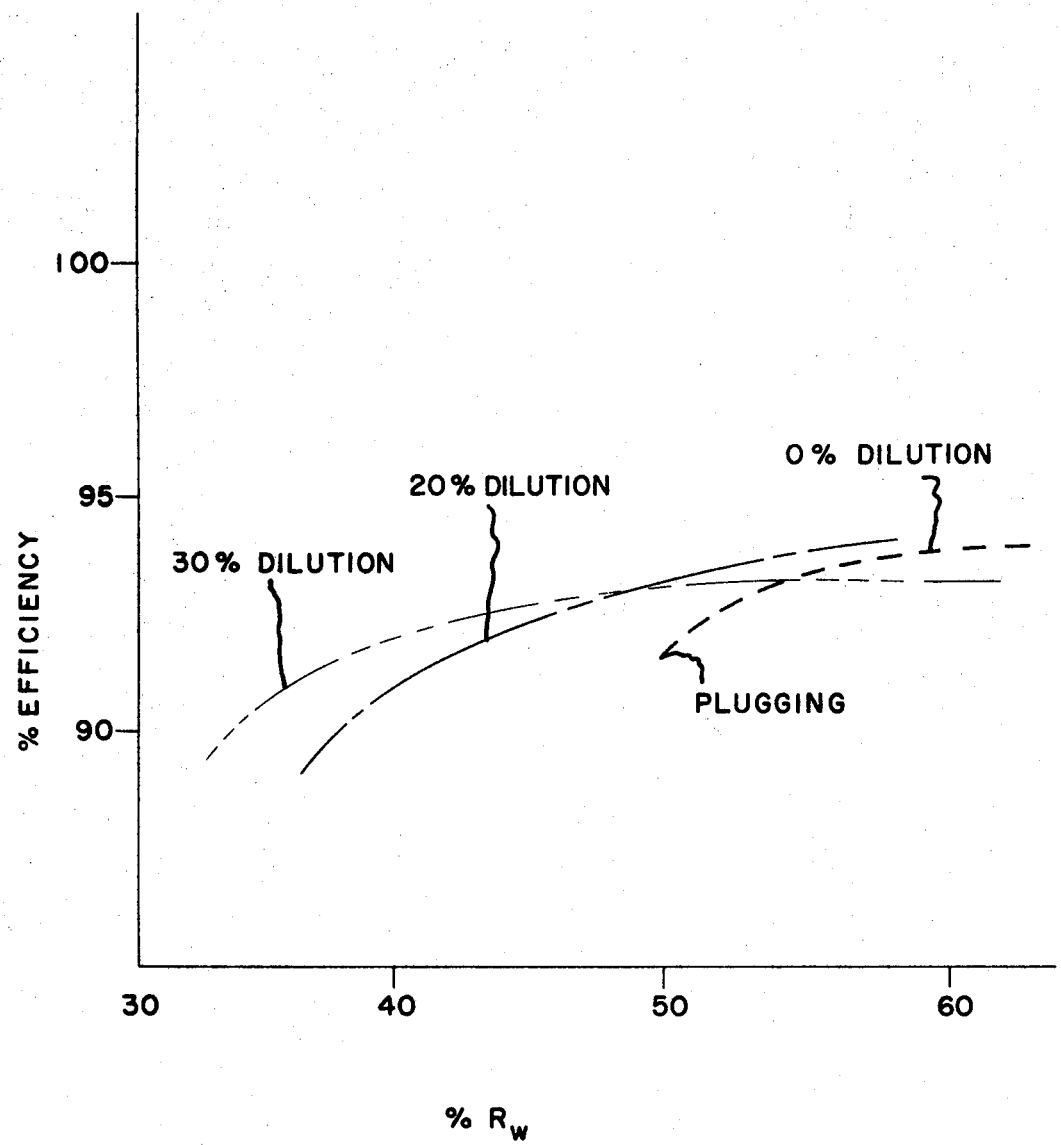
FIG. 5 is a curve illustrating the efficiency of the screening apparatus operating under several dilution conditions.

The curve shown in FIG. 5 illustrates the operation of the screening apparatus 1 under several different conditions of dilution. This curve represents the operation of the apparatus in a secondary screening operation handling ground wood pulp and with the inlet flow of material having a high debris content, say 9%.

The horizontal axis of this curve represents the percentage ratio by weight of the rejected solid material divided by the inlet or total solid material fed to the apparatus. This ratio does not include water or other liquid. This ratio is expressed by the formula:

Percent $R_w$=Rejects weight/Inlet weight$\times$100

The vertical axis represents the cleaning efficiency of the screening operation and is represented by the formula:

$$E=\left[1-\left(\frac{A_w \times S_a}{S_I}\right)\right]100$$

where $A_w$=total weight of accepted solid material
$S_a$=weight of shives in accepts flow
$S_I$=weight of shives in inlet flow All of the above weights are measured minus water.

Looking at FIG. 5, it will be noted that the curve indicating 0% dilution begins dropping rapidly after passing below about 55% $R_w$. At about 50% $R_w$, the screen starts to plug, as indicated by the legend.

When 20% dilution is used, the apparatus operates below 40% $R_w$ before starting to plug while 30% dilution further reduces the percent $R_w$ operating range. It can readily be seen that it is far better to operate the apparatus at, say 45% $R_w$ rather than 55% $R_w$, since the reduced $R_w$ provides an increased percentage of accepted material.

It is not known exactly how the dilution method of this invention enables the reduction of the percent $R_w$, but it is believed that the added dilution liquid aids in separating the acceptable material from the debris or shives. Otherwise, it appears that the acceptable material tends to stick to the debris or shives and is carried into the rejects gutter 18 during the screening process. In addition, the dilution may help in keeping the apertures open in the screen 12.

*Second embodiment—FIG. 6*

FIG. 6 illustrates a different form of screening apparatus employing a disc screen 12' and a rotary disc 24' carrying bumps 56'. The various parts of this embodiment have reference numbers with primes corresponding to the reference numbers of similar parts in the first embodiment.

This second embodiment has a dilution pipe 62' ending in an outlet 65' which is flush with the upper face of the screen 12'. The dilution pipe 62' contains a valve 68' for regulating the flow of dilution liquid. Inlet material flows through the inlet conduit 8' into the screening zone 60' while the rotary disc 24' rotates. Accepted material flows through the screen 12 into the accepts chamber 14' while the debris flows radially into the rejects gutter 18'. In the method of this invention, dilution liquid is continuously introduced into the screening zone 60' by the pipe 62' to improve the screening process as explained earlier.

Although two embodiments of the invention are illustrated and described in detail, it is pointed out that the invention is not limited simply to these embodiments but contemplates other embodiments and variations which utilize the concepts and teachings of this invention.

Having described my invention, I claim:

1. In a screening apparatus for screening a liquid mixture of acceptable fiber and debris, the combination comprising:

a pulse-generating rotary wall member including an irregular surface;

a perforated circular screen surrounding said rotary wall member in spaced relationship and cooperating with it to form an annular screening zone through which the liquid mixture can pass while exposed to said screen, said screen being adapted to pass acceptable fiber therethrough while rejecting debris;

an inlet provided in said apparatus for feeding the liquid mixture to one end of said annular screening zone;

an outlet provided in said apparatus for receiving the rejected portion of said mixture from the other end of said annular screening zone;

an accepts chamber surrounding said screen for receiving the portion of said liquid mixture passing through said screen; and one or more dilution conduits extending through said accepts chamber and projecting through said screen and having discharge openings facing said rotary wall member for discharging dilution liquid into said screening zone and onto said rotary wall member, said discharge openings being of sufficient size to pass a dilution liquid containing fibers without being plugged and all of said discharge openings being located within an arcuate portion which is less than 180 degrees of the circumference of said screen to avoid generating an annular ring of dilution liquid circling said rotary wall member.

2. The screening apparatus of claim 1 wherein:
at least one of said discharge openings terminates flush with the surface of said screen facing said screening zone.

3. The screening apparatus of claim 1 including:
a plurality of said dilution conduits located at different portions of the path of the liquid mixture flowing through said screening zone.

4. The screening apparatus of claim 1 wherein:
the axis of at least one of said discharge openings extends substantially perpendicular to said rotary wall member.

5. The screening apparatus of claim 1 wherein:
at least one of said discharge openings in said dilution conduit has an internal diameter of at least one inch.

6. In a screening apparatus for a fluid comprising a mixture of fibrous material and liquid, the apparatus comprising an apertured screen member in the form of a surface of revolution, a pulse-generating rotary wall member in the general form of a drum mounted on a vertical axis within said screen member and defining therewith an annular screening zone through which fluid can proceed while exposed to the screen member, means for supplying fluid to the top end of said annular screening zone, an accepts chamber surrounding said screen member for receiving the portion of fluid which passes through said screen member, and means for removing rejected matter from the bottom end of said annular screening zone, the improvement including:
one or more dilution conduits extending through said accepts chamber and projecting through said screen and having discharge openings facing said rotary wall member for discharging dilution liquid into said screening zone and onto said rotary wall member, said discharge openings being of sufficient size to pass a dilution liquid containing fibers without being plugged and all of said discharge openings being located within an arcuate portion which is less than 180 degrees of the circumference of said screen to avoid generating an annular ring of dilution liquid circling said rotary wall member.

7. A method of screening a liquid mixture of acceptable fiber and debris comprising:
flowing said liquid mixture vertically downward through an annular screening zone having a vertical axis formed by an apertured circular screen surrounding said zone and a pulse-generating rotary wall member mounted on a vertical axis located on the inner side of said zone;
introducing additional dilution liquid into said screening zone intermediate the upper and lower ends of said zone through a discharge outlet located on the inside of said screen and limited to an arcuate portion which is less than 180 degrees of the circumference of said screen to avoid creating an annular ring of dilution liquid circling said rotary wall member; and
withdrawing the rejected matter from the lower end of said annular screening zone.

References Cited

UNITED STATES PATENTS

| 625,237 | 5/1899 | Baker | 209—306 X |
| 811,930 | 2/1906 | Kihigren | 209—300 X |
| 1,722,874 | 7/1929 | Wells | 209—273 |

FOREIGN PATENTS

| 55,274 | 9/1912 | Austria. |
| 49,402 | 10/1931 | Norway. |
| 380,283 | 9/1923 | Germany. |

HARRY B. THORNTON, *Primary Examiner.*

ROBERT HALPER, *Assistant Examiner.*

U.S. Cl. X.R.

209—306, 380; 210—209